United States Patent
Fey et al.

(10) Patent No.: US 11,098,668 B2
(45) Date of Patent: Aug. 24, 2021

(54) METHOD AND CONTROL UNIT FOR OPERATING AN INTERNAL COMBUSTION ENGINE WHICH HAS A FIRST EXHAUST-GAS PURIFICATION COMPONENT AND A SECOND EXHAUST-GAS PURIFICATION COMPONENT

(71) Applicant: Robert Bosch GmbH, Stuttgart (DE)

(72) Inventors: Michael Fey, Wiernsheim (DE); Alexandre Wagner, Stuttgart (DE); Martin Knopp, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/656,760

(22) Filed: Oct. 18, 2019

(65) Prior Publication Data

US 2020/0123996 A1    Apr. 23, 2020

(30) Foreign Application Priority Data

Oct. 22, 2018   (DE) ..................... 10 2018 218 051.2

(51) Int. Cl.
*F01N 3/22* (2006.01)
*F01N 3/30* (2006.01)
(Continued)

(52) U.S. Cl.
CPC ........... *F02D 41/1441* (2013.01); *F01N 3/22* (2013.01); *F01N 3/30* (2013.01); *F01N 9/00* (2013.01);
(Continued)

(58) Field of Classification Search
CPC ..... F01N 3/22; F01N 3/20; F01N 9/00; F01N 9/005; F01N 13/009; F01N 2430/00;
(Continued)

(56) References Cited

U.S. PATENT DOCUMENTS

| | | | |
|---|---|---|---|
| 5,778,662 A | * | 7/1998 | Mori .................. F01N 3/22 60/274 |
| 2008/0190099 A1 | * | 8/2008 | Yezerets ............... F01N 3/0842 60/297 |

(Continued)

FOREIGN PATENT DOCUMENTS

| | | | |
|---|---|---|---|
| DE | 102017201742 | | 8/2018 |
| DE | 102017201742 A1 | * | 8/2018 ............. F01N 3/101 |

*Primary Examiner* — Audrey K Bradley
(74) *Attorney, Agent, or Firm* — Michael Best & Friedrich LLP

(57) ABSTRACT

A method for operating an internal combustion engine which has an exhaust-gas system in which a first exhaust-gas purification component and a second exhaust-gas purification component are arranged, and which has an opening-in point via which secondary air can be injected into the exhaust-gas system. The method is distinguished by the fact that an outlet concentration of the at least one exhaust-gas constituent prevailing at an outlet of the first exhaust-gas purification component is calculated by means of an outlet emissions model, and that an inlet concentration of the at least one exhaust-gas constituent prevailing at an inlet of the second exhaust-gas purification component is determined in a manner dependent on the calculated outlet concentration, and that the internal combustion engine is operated in a manner dependent on the thus determined inlet concentration of the at least one exhaust-gas constituent.

13 Claims, 5 Drawing Sheets

(51) Int. Cl.
*F01N 9/00* (2006.01)
*F01N 13/00* (2010.01)
*F02D 41/02* (2006.01)
*F02D 41/14* (2006.01)

(52) U.S. Cl.
CPC ........... *F01N 9/005* (2013.01); *F01N 13/009* (2014.06); *F02D 41/0235* (2013.01); *F02D 41/1454* (2013.01); *F01N 2430/00* (2013.01); *F01N 2900/0408* (2013.01); *F01N 2900/1402* (2013.01); *F01N 2900/1804* (2013.01); *F02D 2200/0814* (2013.01)

(58) Field of Classification Search
CPC ..... F01N 2900/0408; F01N 2900/1402; F01N 2900/1804
See application file for complete search history.

(56) References Cited

U.S. PATENT DOCUMENTS

| | | | | |
|---|---|---|---|---|
| 2013/0101471 A1* | 4/2013 | Yacoub | ............... | F01N 3/023 422/168 |
| 2017/0167337 A1* | 6/2017 | Choung | ............... | F01N 3/0842 |
| 2017/0370264 A1* | 12/2017 | Meier | ............... | F01N 3/30 |
| 2019/0203629 A1* | 7/2019 | Zink | ............... | F01N 3/2006 |
| 2020/0116061 A1* | 4/2020 | Hupfeld | ............... | F01N 1/14 |

* cited by examiner

METHOD AND CONTROL UNIT FOR OPERATING AN INTERNAL COMBUSTION ENGINE WHICH HAS A FIRST EXHAUST-GAS PURIFICATION COMPONENT AND A SECOND EXHAUST-GAS PURIFICATION COMPONENT

BACKGROUND OF THE INVENTION

The present invention relates to a method and to a control unit. The invention furthermore relates to a computer program product and to a computer-readable medium.

These subjects are known from DE 10 2017 201 742 A1. The known method relates to an internal combustion engine which has an exhaust-gas system in which a first exhaust-gas purification component and, downstream of the first exhaust-gas purification component, a second exhaust-gas purification component are arranged. In the case of the known subject matter, an opening-in point via which secondary air can be injected into the exhaust-gas system is arranged between the first exhaust-gas purification component and the second exhaust-gas purification component. The second exhaust-gas purification component has an accumulator for at least one exhaust-gas constituent.

For the control of internal combustion engines, lambda probes are used, by means of which oxygen concentrations in the exhaust gas are detected. The air ratio lambda is a measure of the fuel/air ratio with which internal combustion engines are operated. Here, use is made of broad-band lambda probes and step-change lambda probes. With a broad-band lambda probe, the exhaust-gas lambda value can be controlled in continuous closed-loop fashion in a broad lambda range, because its signal has a relatively low gradient over a broad range of lambda values. By means of a linearization of the probe characteristic curve, continuous closed-loop lambda control is also possible with a relatively inexpensive step-change lambda probe, albeit in a restricted lambda range. In relation to a broad-band lambda probe, a step-change lambda probe has considerably greater accuracy in a narrow range around lambda=1 owing to its step-change probe characteristic curve. Outside this narrow range around the air ratio lambda=1, which denotes a stoichiometric fuel/air ratio, the accuracy of a step-change lambda probe in the case of rich lambda (less than 1) or lean lambda (greater than 1) is generally lower, owing to tolerance and aging effects, than that of a broad-band lambda probe.

In general, therefore, in engine control systems, broad-band lambda probes are used where it is sought to accurately measure rich or lean lambda values, or where a measurement with restricted accuracy in the range around lambda=1 is sufficient. Step-change lambda probes are used where it is sought to measure the exhaust-gas lambda value with high accuracy in the range around lambda=1. Typical applications for a broad-band lambda probe are the closed-loop lambda control upstream of the catalytic converter and the balancing of the oxygen input and output, for example during the diagnosis of a catalytic converter. Typical applications of a step-change lambda probe are the exact lambda=1 closed-loop control downstream of the catalytic converter and the detection of a breakthrough of rich or lean exhaust gas during the diagnosis of the catalytic converter.

A typical exhaust-gas system of a fuel system for modern stringent emissions and diagnostics requirements (for example SULEV) is composed of a broad-band lambda probe, a first three-way catalytic converter as first exhaust-gas purification component, a step-change lambda probe, and a second, unmonitored three-way catalytic converter as second exhaust-gas purification component.

Even more stringent future emissions and diagnostics requirements (for example China 6) require exhaust-gas systems not only in which the second catalytic converter is likewise monitored but also in which the particle count in the exhaust gas is limited. The second three-way catalytic converter must therefore be combined with a particle filter or replaced by a coated particle filter, which is also referred to as four-way catalytic converter. Where reference is made hereinafter to a four-way catalytic converter, this is thus intended to mean both a series embodiment of a three-way catalytic converter and also a catalytically coated particle filter.

For optimum operation of the four-way catalytic converter, it is necessary to know as exactly as possible at least the oxygen concentration in the exhaust gas upstream of said catalytic converter. In the case of a three-way catalytic converter, this information is necessary in order to operate the catalytic converter in the so-called catalytic converter window, a narrow lambda range around the stoichiometric operating point (lambda=1). Only in this way is it possible to simultaneously achieve high conversion rates for HC, CO and $NO_x$. In the case of a particle filter, the knowledge of the oxygen concentration upstream of the filter is necessary for quickly attaining the operating temperature thereof and the regeneration thereof without inadmissibly high emissions or damage to the particle filter.

The oxygen concentration in the exhaust gas upstream of a second catalytic converter is commonly determined by means of a step-change lambda probe. The use of a broad-band lambda probe upstream of the second catalytic converter is however also conceivable.

It is a prerequisite in both cases that a unique relationship exists between the oxygen concentration at the installation position of said lambda probe and the signal of the lambda probe, because otherwise the accuracy of closed-loop control or pilot control on the basis of these signals is inadequate, and inadmissibly high emissions, or damage to a particle filter part of a four-way catalytic converter, may arise.

Depending on the exhaust-gas composition between the three-way catalytic converter and a four-way catalytic converter, the lambda probe arranged between the three-way catalytic converter and the four-way catalytic converter may have different output signals despite the same exhaust-gas lambda value. Examples of possible causes are:

Downstream of a three-way catalytic converter, in the presence of a constant rich lambda value, a temporally varying ratio between hydrogen ($H_2$) and carbon monoxide (CO) arises. A reason for this is the water-gas shift reaction, which the catalytic converter cannot (permanently) set into equilibrium. After a change from lambda=1 or a lean lambda value to a constant rich lambda value, the catalytic converter initially outputs an $H_2$ quantity that approximately corresponds to equilibrium. Over time, however, the catalytic converter outputs far too much CO in relation to $H_2$. Owing to the different cross-sensitivities for $H_2$ and CO, a lambda probe arranged downstream of the three-way catalytic converter exhibits a temporally intensely varying signal despite the fact that the lambda value at the probe position is constant.

In the case of active secondary air injection, in addition to the different cross-sensitivities of the lambda probe for $H_2$, CO and $O_2$, a pre-catalysis of $H_2$ with $O_2$ in the probe comes to bear. Because only small amounts of the $O_2$ that is present can be catalytically converted in the probe, this fraction is greatly dependent on the amount of $O_2$ that is present. In this case, too, a different probe signal arises in a manner dependent on the exhaust-gas composition despite the fact that the lambda value at the probe position is constant.

Since the probe signal is generally influenced by different cross-sensitivities of the probe with respect to different exhaust-gas components (for example CO, $CO_2$, $H_2$, $H_2O$, HC, $NO_x$), and the exhaust-gas composition may differ in the presence of different operating conditions despite the same exhaust-gas lambda value, this prerequisite is generally not satisfied either in the case of a broad-band lambda probe or in the case of a step-change lambda probe. Such concepts therefore have the disadvantage that the second catalytic converter cannot be operated optimally.

SUMMARY OF THE INVENTION

The present invention differs from this prior art in each case by the characterizing features of the independent claims. With regard to its method aspects, the invention is distinguished by the fact that an outlet concentration of the at least one exhaust-gas constituent prevailing at an outlet of the first exhaust-gas purification component is calculated by means of an outlet emissions model, and that an inlet concentration of the at least one exhaust-gas constituent prevailing at an inlet of the second exhaust-gas purification component is determined in a manner dependent on the calculated outlet concentration, and that the internal combustion engine is operated in a manner dependent on the thus determined inlet concentration of the at least one exhaust-gas constituent.

With these features, the invention permits operation of an internal combustion engine, which has an exhaust-gas system with multiple exhaust-gas purification components, in a manner which is optimal for the action of a second exhaust-gas purification component arranged downstream of a first exhaust-gas purification component in a flow direction of the exhaust gas.

The concentration of at least one exhaust-gas constituent, for example oxygen, downstream of the (first) exhaust-gas purification component which is situated at the front in a flow direction is modelled by means of a mathematical model and is used instead of the signal, or in addition to the signal, of a lambda probe which is arranged upstream of the (second) exhaust-gas purification component which is situated at the rear in the flow direction, in order to optimize the action of the second exhaust-gas purification component.

The use of modelled exhaust-gas concentrations instead of a potentially falsified signal of a lambda probe or of some other exhaust-gas sensor or in addition to said signal permits optimum operation of the second exhaust-gas purification component in particular even if the corresponding lambda probe or the other exhaust-gas sensor is not yet operational, or is defective. This leads to lower emissions, such that more stringent legal requirements can be adhered to with lower costs for the exhaust-gas purification component (for example less high-grade metal in the case of a catalytic converter). Furthermore, the risk of damage to the exhaust-gas purification component (for example as a result of overheating) is reduced. The required robustness is achieved by means of an adaptation of the system model, which makes it possible to compensate uncertainties of measured or modelled variables that are input into the system model.

A preferred embodiment is distinguished by the fact that the internal combustion engine is, for closed-loop control of a filling level of the accumulator of the second exhaust-gas purification component, operated in a manner dependent on an inlet concentration of the second exhaust-gas purification component, which is determined as being identical to the calculated outlet concentration of the first exhaust-gas purification component.

By means of the closed-loop control of the filling level, the latter can be kept at a (mean) level which promotes optimum pollutant conversion: in the case of an oxygen deficiency in the exhaust gas, the second exhaust-gas purification component can release oxygen to the exhaust gas. In the case of an excess of oxygen in the exhaust gas, the second exhaust-gas purification component can absorb oxygen from the exhaust gas.

It is also preferable if the internal combustion engine is operated in a manner dependent on an inlet concentration which is determined by means of an inlet emissions model of the second exhaust-gas purification component. The determination is performed, in the case of an internal combustion engine which has an exhaust-gas system in which an opening-in point via which secondary air can be injected into the exhaust-gas system is arranged between the first exhaust-gas purification component (31) and the second exhaust-gas purification component, in a manner dependent on outlet concentrations, calculated by means of an outlet emissions model of the first exhaust-gas purification component, of the at least one exhaust-gas constituent and on an introduced secondary air quantity.

By taking into consideration a secondary air quantity injected between the two exhaust-gas purification components, the second exhaust-gas purification component can be chemically heated and/or regenerated substantially independently of the first exhaust-gas purification component.

It is furthermore preferable that the internal combustion engine is operated such that the outlet emissions model calculates, for the concentration of the at least one exhaust-gas constituent prevailing at the outlet of the first exhaust-gas purification component, a value which corresponds to an air ratio lambda<0.92, in particular for example an air ratio lambda=0.9, and that such an amount of secondary air is injected that the inlet emissions model calculates, for the concentration of the at least one exhaust-gas constituent prevailing at the inlet of the second exhaust-gas purification component, a value which corresponds to an air ratio lambda equal to 1. Together with the then inevitably rich combustion chamber lambda value, the result is a reactive exhaust-gas atmosphere which reacts exothermically in the catalytically active second exhaust-gas purification component and thus heats the second exhaust-gas purification component independently of the first exhaust-gas purification component.

A further preferred embodiment is distinguished by the fact that the internal combustion engine is operated such that the outlet emissions model calculates, for the concentration of the at least one exhaust-gas constituent prevailing at the outlet of the first exhaust-gas purification component, a value which corresponds to an air ratio lambda 0.98<lambda less than or equal to 1, and that such an amount of secondary air is injected that the inlet emissions model calculates, for the concentration of the at least one exhaust-gas constituent prevailing at the inlet of the second exhaust-gas purification component, a value which corresponds to a lambda value greater than 1.08, in particular for example lambda=1.1.

By means of this embodiment, the preferably already heated second exhaust-gas purification component is provided with oxygen, with which, for example, a particle filter component of the second exhaust-gas purification component can be regenerated, wherein accumulated soot particles are burned off.

Altogether, these embodiments with the modelled concentration permit fast heating of the second exhaust-gas purification component to its operating temperature, and control of the regeneration of said exhaust-gas purification component.

It is also preferable if the concentration calculated by the outlet emissions model for the concentration of the at least one exhaust-gas constituent prevailing at the outlet of the first exhaust-gas purification component is used for modelling a soot loading of the second exhaust-gas purification component. Triggering of regeneration processes in accordance with demand is thus promoted.

With regard to embodiments of the control unit, it is preferable for said control unit to be configured to control an execution of a method according to any of the preferred embodiments of the method.

BRIEF DESCRIPTION OF THE DRAWINGS

Further advantages will emerge from the description and from the appended figures.

It is self-evident that the features mentioned above and the features yet to be discussed below may be used not only in the respectively the specified combination but also in other combinations or individually without departing from the scope of the present invention.

Figure 1:
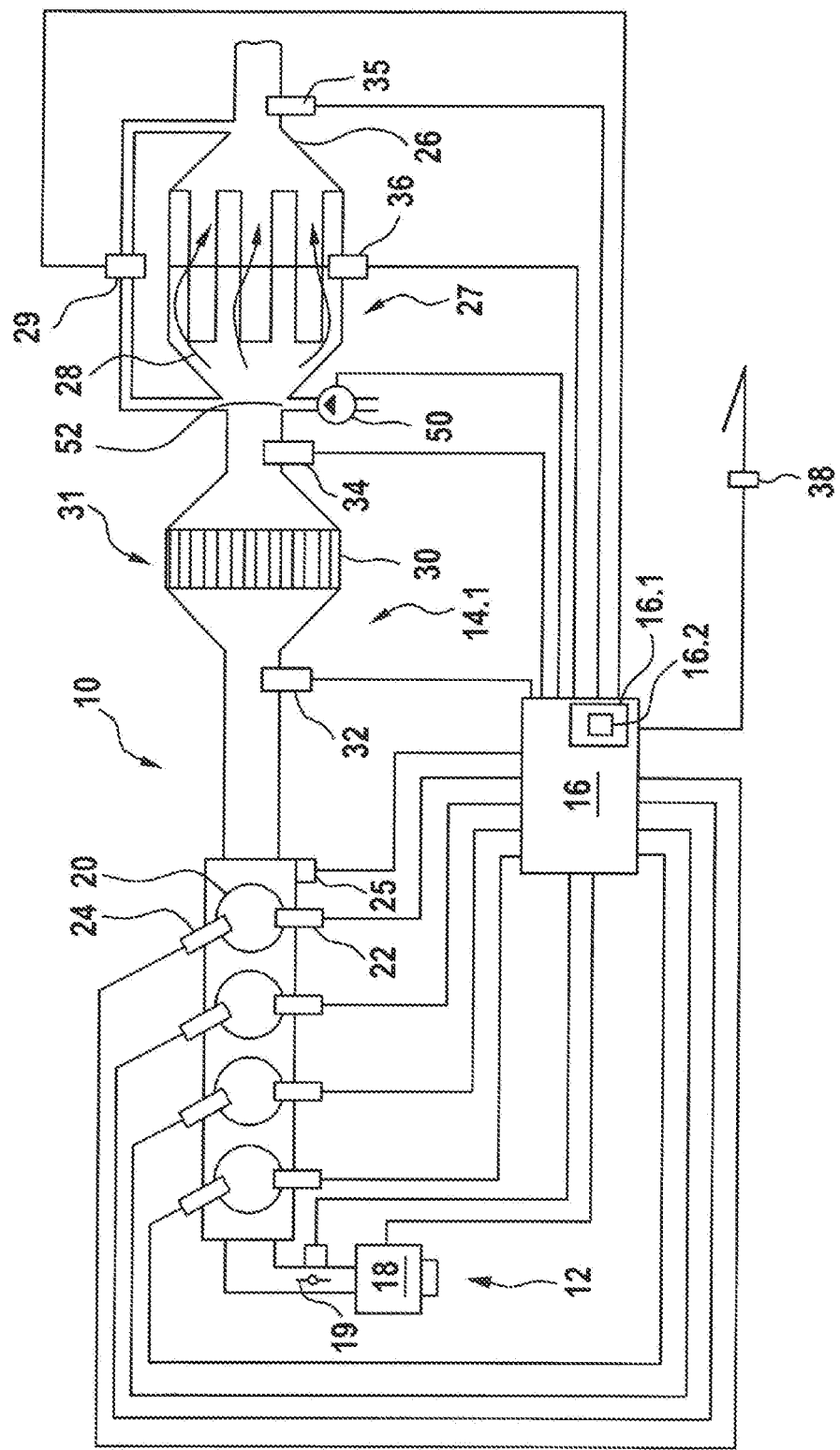
Figure 2:
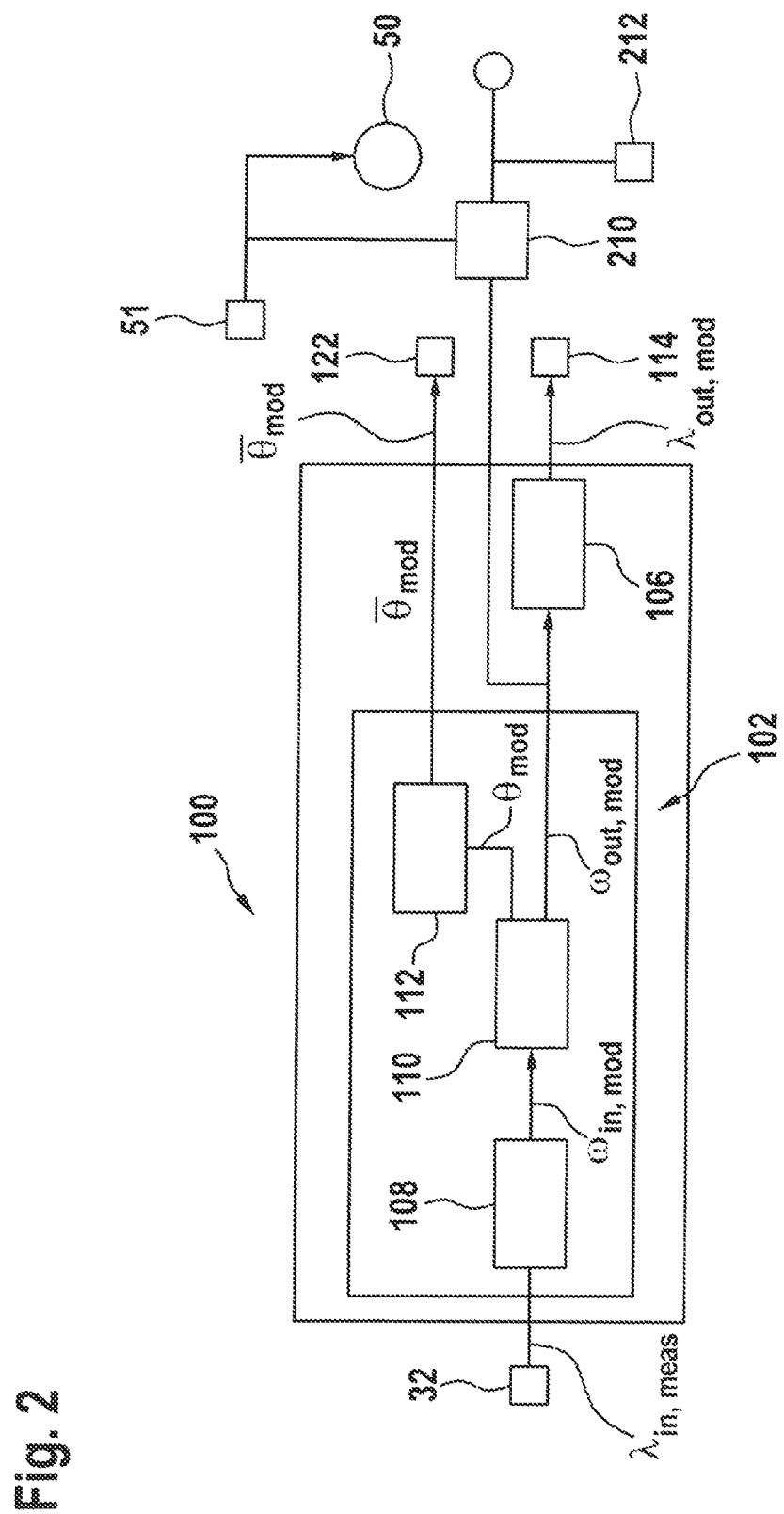
Figure 3:
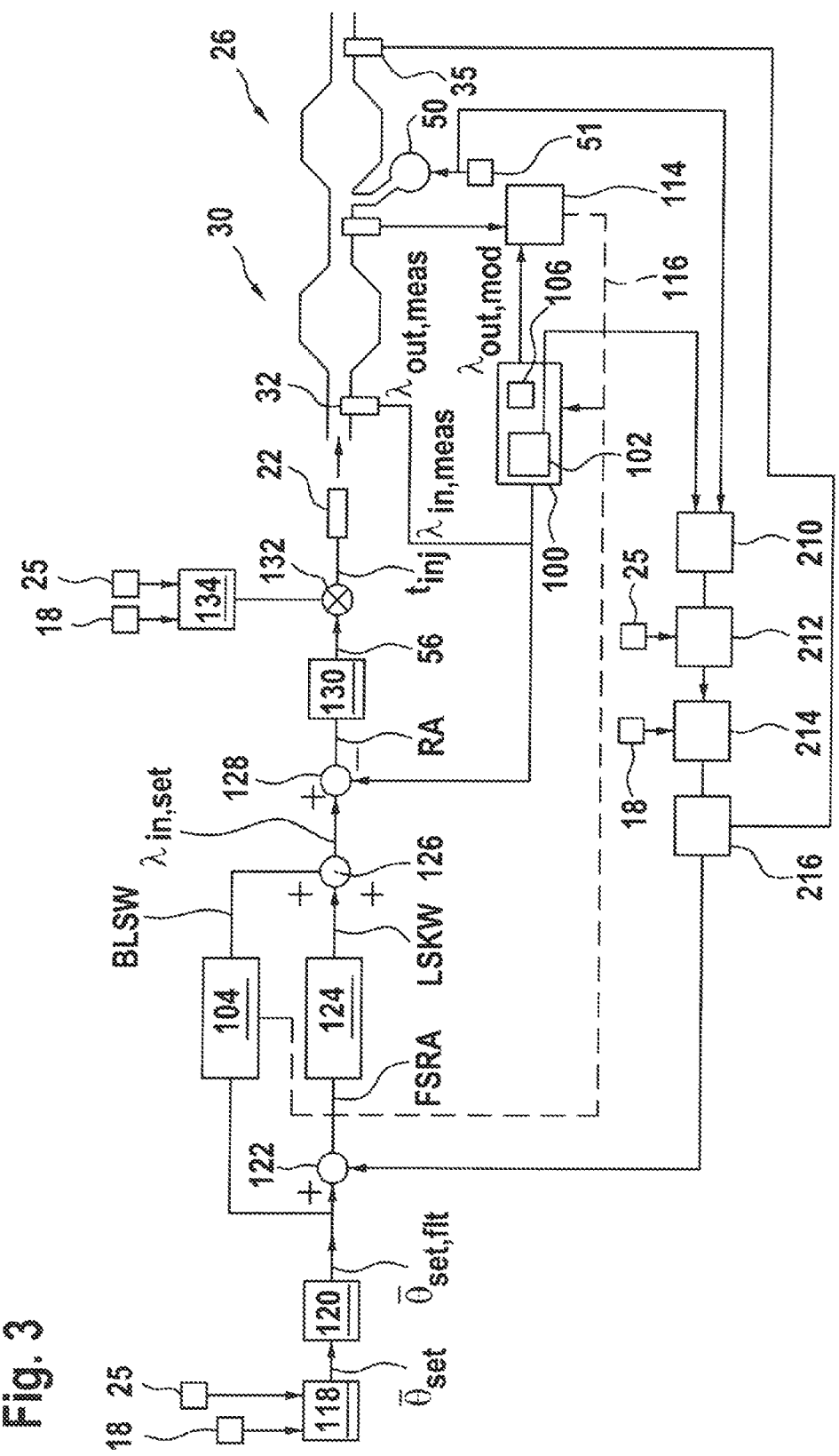
Figure 4:
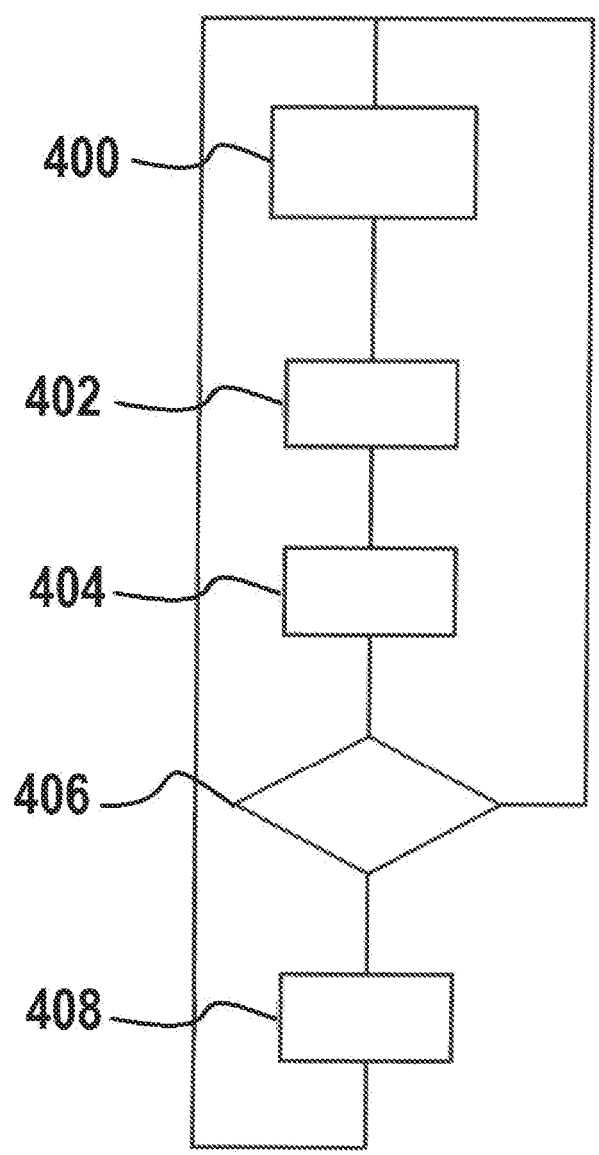
Figure 5:
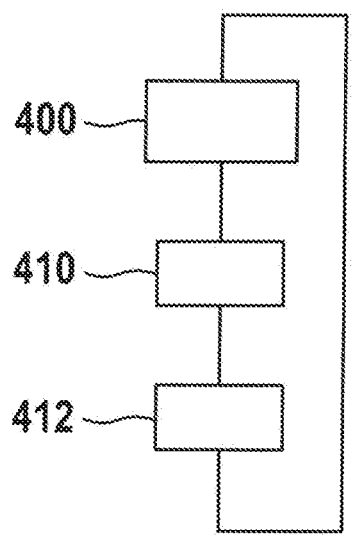
Figure 6:
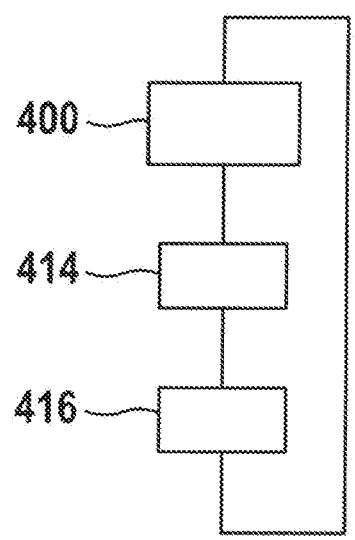

Exemplary embodiments of the invention are illustrated in the drawings and will be discussed in more detail in the following description. Here, the same reference designations in different figures denote in each case identical elements, or at least elements which are similar in terms of their function. In the drawings, in each case schematically:

FIG. 1 shows an internal combustion engine with an exhaust-gas system as the technical environment of the invention;

FIG. 2 shows a functional block illustration of a system model;

FIG. 3 shows a functional block illustration of an exemplary embodiment of a method according to the invention;

FIG. 4 shows a flow diagram as an exemplary embodiment for the determination of a filling level of a second exhaust-gas purification component;

FIG. 5 shows a flow diagram as an exemplary embodiment of a mode of operation that leads to heating of the second exhaust-gas purification component; and FIG. 6 shows a flow diagram as an exemplary embodiment of a mode of operation which leads to a regeneration of the second exhaust-gas purification component.

DETAILED DESCRIPTION

The invention will be described below on the basis of the example of an internal combustion engine with a three-way catalytic converter as first exhaust-gas purification component and of a four-way catalytic converter and oxygen as exhaust-gas constituent. The invention is however analogously also transferable to other exhaust-gas purification components (catalytic converters and filters) and other exhaust-gas constituents such as nitrogen oxides and hydrocarbons.

Specifically, FIG. 1 shows an internal combustion engine 10 with an air supply system 12, an exhaust-gas system 14 and a control unit 16. In the air supply system 12, there is situated an air mass sensor 18 and a throttle flap 19 arranged downstream of the air mass sensor 18. The air that flows into the internal combustion engine 10 via the air supply system 12 is mixed, in combustion chambers 20 of the internal combustion engine 10, with fuel that is injected by means of injection valves 22 directly into the combustion chambers 20 or upstream of inlet valves of the combustion chambers. The resulting combustion chamber charges are ignited by means of ignition devices 24, for example ignition plugs, and burned. A rotational angle sensor 25 detects the rotational angle of a shaft of the internal combustion engine 10 and thus enables the control unit 16 to trigger the ignitions at predetermined angular positions of the shaft. A driver demand encoder 38 detects an accelerator pedal position and thus torque demands of the driver and transmits signals representing torque demands to the control unit 16.

From the input signals, which also include signals other than the signals mentioned merely as examples, the control unit 16 forms activation signals for actuating elements of the internal combustion engine 10, which lead inter alia to the internal combustion engine 10 generating the demanded torque. The exhaust gas resulting from the combustions is discharged through the exhaust-gas system 14. The control unit 16 has a computer-readable medium 16.1, for example a memory chip, on which a computer program product 16.2 according to the invention is stored in machine-readable form.

The exhaust-gas system 14 has, as first exhaust-gas purification component 31, a three-way catalytic converter 30, and has, as second exhaust-gas purification component 27, a particle filter, or four-way catalytic converter 26, arranged downstream of the three-way catalytic converter 30 in the exhaust-gas flow. The four-way catalytic converter 26 has an internal honeycomb structure composed of porous filter material, which is flowed through by the exhaust gas 28 and which retains particles contained in the exhaust gas 28.

The four-way catalytic converter 26 is based for example on a particle filter, the filter material of which is catalytically coated, such that, in addition to its particle filter action, it also has the action of a three-way catalytic converter. As is known, the three-way catalytic converter converts the three exhaust-gas constituents nitrogen oxides, hydrocarbons and carbon monoxide on three reaction paths. The particle filter action constitutes a fourth path, which is the basis for the term four-way catalytic converter 26. The second exhaust-gas purification component 31 may also be realized as a combination of a second three-way catalytic converter with a particle filter (without catalytic coating) arranged downstream of the second three-way catalytic converter.

The loading of the four-way catalytic converter 26 with particles increases the flow resistance thereof for the exhaust gas 28 and thus a differential pressure that arises across the four-way catalytic converter 26. The differential pressure is measured for example by means of a differential pressure sensor 29, the output signal of which is transmitted to the control unit 16, or, using information items (measured values and/or actuating variables) that are present in the control unit 16, said differential pressure is calculated by means of a mathematical model that models the loading with particles. From the exhaust-gas mass flow that is known in the control unit 16 and the differential pressure, the flow resistance is obtained by calculation or by using characteristic curves. Upstream of the three-way catalytic converter 30, a front lambda probe 32 that is exposed to the exhaust gas is arranged directly in front of the three-way catalytic converter 30.

A further lambda probe 34, which is likewise exposed to the exhaust gas, is arranged between the three-way catalytic converter 30 and the four-way catalytic converter 26.

Downstream of the four-way catalytic converter 26, a rear lambda probe 35, which is likewise exposed to the exhaust gas, is arranged directly after the four-way catalytic converter 26. The front lambda probe 32 is preferably a broadband lambda probe, which permits a measurement of the air ratio lambda over a broad air ratio range. The further lambda probe 34 and the rear lambda probe 35 are preferably so-called step-change lambda probes, with which the value 1 of the air ratio lambda can be measured particularly accurately, because the signal of this lambda probe performs a step change at said value. See Bosch, Automotive Handbook, 23rd edition, page 524.

A device 50 for the supply of secondary air, which device is controlled by the control unit 16 and is for example a combination of a secondary air pump and a secondary air valve, is configured and arranged to inject air into the exhaust-gas system 14 via an opening-in point 52 arranged between the three-way catalytic converter 30 and the four-way catalytic converter 26, in order to provide sufficient atmospheric oxygen for fast heating of the four-way catalytic converter 26 to its operational readiness temperature (for example to the light-off temperature of a catalytic coating) and an effective regeneration of the particle filter part of the four-way catalytic converter, without the internal combustion engine 10 having to be operated with an excess of air for this purpose, which is unfavorable for the pollutant conversion in the three-way catalytic converter 30.

The control unit 16 processes the signals of the air mass sensor 18, of the rotational angle sensor 25, of the differential pressure sensor 29, of the front lambda probe 32, of the further lambda probe 34, of the rear lambda probe 35 and of an optionally provided temperature sensor 36 which detects a temperature of the four-way catalytic converter 26, and, from these, said control unit forms activation signals for the setting of the angular position of the throttle flap 18, for the triggering of ignitions by the ignition device 20, for the injection of fuel through the injection valves 22, and for the activation of the device 50 for supplying secondary air. Alternatively or in addition, the control unit 16 also processes signals of other or further sensors, such as the signal of a driver demand encoder 38, for the purposes of activating the actuating elements presented or else further or other actuating elements.

FIG. 2 shows a functional block illustration of a system model 100 and further functions of an exemplary embodiment of the present invention. A system model is to be understood here to mean an algorithm which links input variables, which also have an effect on the real object represented by the system model, to output variables, such that the calculated output variables correspond as exactly as possible to the output variables of the real object.

In the case considered here, the real object is the entire physical system situated between the input variables and the output variables. The system model 100 is composed of the catalytic converter model 102 and the outlet lambda model 106 for the three-way catalytic converter 30. The catalytic converter model 102 has an inlet emissions model 108 and a filling level and outlet emissions model 110. Furthermore, the catalytic converter model 102 has an algorithm 112 for calculating a mean filling level $\bar{\theta}_{mod}$ of the three-way catalytic converter 30. The models are in each case algorithms which are executed in the control unit 16 and which link input variables, which also have an effect on the real object represented by the mathematical model, to output variables, such that the calculated output variables correspond as exactly as possible to the output variables of the real object.

The inlet emissions model 108 is configured to convert, as input variable, the signal $\lambda_{in,meas}$ of the front exhaust-gas probe 32 arranged in front of the three-way catalytic converter 30 into input variables $w_{in,mod}$ required for the downstream filling level model 110. For example, a conversion of lambda into the concentrations of $O_2$, CO, $H_2$ and HC upstream of the three-way catalytic converter 30 by means of the inlet emissions model 108 is advantageous.

With the variables $w_{in,mod}$ calculated by means of the inlet emissions model 108 and possibly additional input variables (for example exhaust-gas or catalytic converter temperatures, exhaust-gas mass flow and present maximum oxygen storage capacity of the three-way catalytic converter 30), a filling level $\theta_{mod}$ of the three-way catalytic converter 30 and concentrations $w_{out,mod}$ of the individual exhaust-gas components at the outlet of the three-way catalytic converter 30 are modelled in the filling level and outlet emissions model 110. Such modelling represents one example of a calculation of an outlet concentration, prevailing at an outlet of the first exhaust-gas purification component 31, of at least one exhaust-gas constituent by means of an outlet emissions model 110.

In an inlet emissions model 210 for the second exhaust-gas purification component 27, an inlet concentration of the at least one exhaust-gas constituent prevailing at an inlet of the second exhaust-gas purification component 27 is determined from the stated outlet concentration and from a signal that represents an influence of a device 50 for the supply of secondary air. The inlet concentration is thus determined inter alia in a manner dependent on the calculated outlet concentration of the at least one exhaust-gas constituent prevailing at the outlet of the first exhaust-gas purification component 31. The device 50 for supplying secondary air is actuated by an output stage 51 of the control unit 16.

In the case of a deactivated secondary air supply, the inlet concentration of the second exhaust-gas purification component is identical to the calculated outlet concentration of the first exhaust-gas purification component.

The internal combustion engine 10 is operated inter alia in a manner dependent on the thus determined inlet concentration of the at least one exhaust-gas constituent. The at least one exhaust-gas constituent is for example oxygen. The inlet emissions model 210 transmits the value, calculated by it, of the inlet concentration prevailing at the inlet of the second exhaust-gas purification component to a conversion unit 212, which generates, for example, a lambda actual value therefrom. The signal that represents the influence of a secondary air supply may be an activation signal of the device 50 for the supply of secondary air.

The algorithm of the outlet lambda model 106 converts the concentrations $w_{out,mod}$ of the individual exhaust-gas components at the outlet of the catalytic converter 30 as calculated by means of the catalytic converter model 102, for the adaptation of the system model 100, into a signal $\lambda_{out,mod}$, which can be compared with the signal $\lambda_{out,meas}$ of the further lambda probe 34 arranged between the three-way catalytic converter 30 and the four-way catalytic converter 26. The lambda value, that is to say the oxygen concentration, is preferably modelled.

The system model 100 thus serves firstly for modelling at least a mean filling level $\bar{\theta}_{mod}$ of the three-way catalytic converter 30, which is adjusted by closed-loop control to a setpoint filling level at which it is safely situated within the catalytic converter window. Secondly, the system model 100 provides a modelled signal $\lambda_{out,mod}$ of the further lambda probe 34 arranged behind the three-way catalytic converter 30. Further below, it will be discussed in more detail how said modelled signal $\lambda_{out,mod}$ of the further lambda probe 34 is advantageously used for the adaptation of the system model 100.

FIG. 3 shows a functional block illustration of an exemplary embodiment of a method according to the invention together with device elements which act on the functional blocks or which are influenced by the functional blocks.

Specifically, FIG. 3 shows how the signal $\lambda_{out,mod}$ of the further exhaust-gas probe 34 as modelled by the outlet lambda model 106 is aligned with the real output signal $\lambda_{out,meas}$ of the further exhaust-gas probe 34. For this purpose, the two signals $\lambda_{out,mod}$ and $\lambda_{out,meas}$ are fed to an adaptation block 114. The adaptation block 114 compares the two signals $\lambda_{out,mod}$ and $\lambda_{out,meas}$ with one another. For example, a step-change lambda probe 34 arranged downstream of the three-way catalytic converter 30 clearly indicates when the three-way catalytic converter 30 has been completely filled with oxygen or completely emptied of oxygen. This can be utilized in order, after lean or rich phases, to bring the modelled oxygen filling level into line with the actual oxygen filling level, or the modelled outlet lambda value $\lambda_{out,mod}$ into line with the lambda value $\lambda_{out,meas}$ measured behind the three-way catalytic converter 30, and to adapt the system model 100 in the event of deviations. The adaptation is performed for example by virtue of the adaptation block 114 successively changing parameters of the algorithm of the system model 100 via the adaptation path 116 illustrated by dashed lines until the lambda value $\lambda_{out,mod}$ modelled for the exhaust gas flowing out of the three-way catalytic converter 30 corresponds to the lambda value $\lambda_{out,meas}$ measured there.

In this way, inaccuracies of measured or modelled variables that are input into the system model 100 are compensated. From the fact that the modelled value $\lambda_{out,mod}$ corresponds to the measured lambda value $\lambda_{out,meas}$, it can be inferred that the filling level $\overline{\theta}_{mod}$ modelled by means of the system model 100, or by means of the first catalytic converter model 102, also corresponds to the filling level, which cannot be measured using on-board means, of the three-way catalytic converter 30. It can then furthermore be inferred that the second catalytic converter model 104, which is inverse with respect to the first catalytic converter model 102 and which is obtained from the algorithm of the first catalytic converter model 102 by mathematical transformations, also correctly describes the behavior of the modelled system.

In the case of the present invention, this is utilized to calculate a base lambda setpoint value BLSW by means of the inverse second catalytic converter model 104. For this purpose, a filling level setpoint value $\overline{\theta}_{set,flt}$ filtered by means of an optional filtering 120 is fed as input variable to the inverse second catalytic converter model 104. The filtering 120 is performed for the purposes of permitting only changes to the input variable of the inverse second catalytic converter model 104 which the closed-loop control path as a whole can follow. A still-unfiltered setpoint value $\overline{\theta}_{set}$ is in this case read out of a memory 118 of the control unit 16. For this purpose, the memory 118 is preferably addressed with present operating characteristic variables of the internal combustion engine 10. The operating characteristic variables are for example, but not imperatively, the rotational speed detected by the rotational speed sensor 25 and the load, detected by the air mass sensor 18, of the internal combustion engine 10. The filtered filling level setpoint value $\overline{\theta}_{set,flt}$ is processed by means of the inverse second catalytic converter model 104 to form a base lambda setpoint value BLSW.

In the inlet emissions model 210, in a manner dependent on output signals of the outlet emissions model 106 of the catalytic converter model 102 and possibly on signals which represent a supply of secondary air, inlet emissions concentrations for the four-way catalytic converter 26 are determined. The signals which represent a supply of secondary air are for example activation signals, by means of which the device 50 for the supply of secondary air is activated. From the inlet emissions thus determined, an inlet lambda value for the four-way catalytic converter 26 is determined in the block 212. In the block 214, the deviation of the inlet lambda value from the value 1, which separates an oxygen deficiency and an oxygen excess, is determined and is multiplied by the exhaust-gas mass flow. The exhaust-gas mass flow is determined for example from the rotational speed detected by the rotational speed sensor 25 and the load, detected by the air mass sensor 18, of the internal combustion engine 10. The value of said exhaust-gas mass flow is in any case present in the control unit 16. The result of the multiplication is a mass flow of oxygen deficiency or oxygen excess, which is integrated in the integrator 216 to give a filling level actual value.

In a preferred embodiment, a catalytic converter model corresponding to FIG. 2 may also be used here for the four-way catalytic converter.

With the signal of the rear lambda probe, the calculated filling level actual value of the four-way catalytic converter 26 can, in certain situations, for example in the case of an oxygen accumulator which is completely full after an overrun operating phase, be aligned with the real filling level of the four-way catalytic converter 26.

In parallel with the processing of the filtered filling level setpoint value $\overline{\theta}_{set,flt}$ by means of the inverse second catalytic converter model 104 to form a base lambda setpoint value BLSW, a filling level closed-loop control deviation FSRA as a deviation of the filling level $\overline{\theta}_{mod}$ modelled by means of the system model 100, or by means of the first catalytic converter model 102, from the filtered filling level setpoint value $\overline{\theta}_{set,flt}$ is formed at a logic operator 122. Said filling level closed-loop control deviation FSRA is fed to a filling level closed-loop control algorithm 124 which, from this, forms a lambda setpoint value corrective value LSKW. Said lambda setpoint value corrective value LSKW is, at the logic operator 126, added to the base lambda setpoint value BLSW calculated by the inverse system model 104.

In a preferred embodiment, the sum thus formed serves as setpoint value $\lambda_{in,set}$ of a conventional closed-loop lambda control system. The lambda actual value $\lambda_{in,meas}$ provided by the first exhaust-gas probe 32 is subtracted from said lambda setpoint value $\lambda_{in,set}$ at a logic operator 128. The closed-loop control deviation RA thus formed is converted by means of a conventional closed-loop control algorithm 130 into an actuating variable SG, which, in a logic operator 132, is combined for example by multiplication with a base value BW, predetermined in a manner dependent on operating parameters of the internal combustion engine 10, of an injection pulse width $t_{inj}$. The basic values BW are stored in a memory 134 of the control unit 16. In this case, too, the operating parameters are preferably, but not imperatively, the load and the rotational speed of the internal combustion engine 10. By means of the injection valves 22, fuel is injected into the combustion chambers 20 of the internal combustion engine 10 with the injection pulse width $\tau_{inj}$ resulting from the product.

In this way, closed-loop control of the oxygen filling level of the three-way catalytic converter 30 is superposed on the conventional closed-loop lambda control. Through suitable setpoint value specification, it is also possible with this structure to perform closed-loop control of the filling level of the four-way catalytic converter. This will be discussed further below with reference to FIG. 4. Here, the mean oxygen filling level $\overline{\theta}_{mod}$ modelled with the aid of the system model 100 or by means of the first catalytic converter model 102 is for example adjusted by closed-loop control to a setpoint value $\overline{\theta}_{set,fit}$ which minimizes the likelihood of breakthroughs after lean and rich periods, and thus leads to minimal emissions. Since the base lambda setpoint value BLSW is formed here by means of the inverted second system model 104, the closed-loop control deviation of the closed-loop filling level control assumes the value zero if the modelled mean filling level $\overline{\theta}_{mod}$ is identical to the pre-filtered setpoint filling level $\overline{\theta}_{set,fit}$. The filling level closed-loop control algorithm 124 intervenes only if this is not the case. Since the formation of the base lambda setpoint value, which acts, as it were, as pilot control of the closed-loop filling level control, is realized as an inverted second catalytic converter model 104 of the first catalytic converter model 102, said pilot control can, analogously to the adaptation of the first catalytic converter model 102, be adapted on the basis of the signal $\lambda_{in,meas}$ of the second exhaust-gas probe 34 arranged behind the three-way catalytic converter 30. This is illustrated in FIG. 3 by the branch of the adaptation path leading to the inverted system model 104.

With the exception of the exhaust-gas system 14, the exhaust-gas probes 32, 34, 35, the air mass sensor 18, the rotational angle sensor 25 and the injection valves 22, all of the elements illustrated in FIG. 3 are constituent parts of a control unit 16 according to the invention. With the exception of the memories 118, 134, all other elements from FIG. 3 are in this case parts of the engine control program 16.1 which is stored and executed in the control unit 16.

The elements 22, 32, 128, 130 and 132 form a first closed control loop in which closed-loop lambda control is performed, wherein the signal $\lambda_{in,meas}$ of the first exhaust-gas probe (32) is processed as lambda actual value. The lambda setpoint value $\lambda_{in,set}$ inset of the first closed control loop is formed in a second closed control loop, which has the elements 22, 32, 100, 210, 212, 122, 124, 126, 128, 132.

An exemplary embodiment of closed-loop filling level control for an oxygen accumulator of a four-way catalytic converter will be described below with reference to FIG. 4. FIG. 4 shows an exemplary embodiment for determining a filling level of the four-way catalytic converter with oxygen as an example of an exhaust-gas constituent.

A block 400 represents a main program for controlling the internal combustion engine 10, in which, for example, the throttle flap 19, the ignition device 20 and the injection valves 22 are activated such that a desired torque is realized.

Since a filling level of the four-way catalytic converter 26 is not directly measurable, it is modelled by means of a mathematical model 16.1 that is to be calculated in the control unit 16 of FIG. 1. The mathematical model 16.1 is a sub-program executed in the control unit 16.

Since a filling level of a catalytic converter cannot be measured, the invention provides for the filling levels—preferably oxygen filling levels—in the three-way catalytic converter 30 and in the four-way catalytic converter 26 to be modelled by means of a mathematical model 16.1. The mathematical model 16.1 is a sub-program executed in the control unit 16.

In the step 402, a present mass flow of oxygen excess and oxygen deficiency at the inlet of the four-way catalytic converter 26 is determined. Such an excess or deficiency is determined as a difference between an oxygen concentration that is composed in a stoichiometric exhaust-gas composition and oxygen concentration determined for the inlet of the four-way catalytic converter by means of the inlet emissions model 210. The step 402 thus corresponds to the function of the block 214 from FIG. 3.

In the step 404, said difference is integrated. The result of the integration is the oxygen filling level. The step 404 thus corresponds to the function of the block 216 from FIG. 3. In step 406, it is queried whether the third lambda probe 35, which is arranged downstream of the four-way catalytic converter 26, indicates a completely full or a completely emptied oxygen accumulator. A completely full oxygen accumulator arises for example after a relatively long over-run operating phase with the activated fuel supply. In this case, the integration in step 408 is initialized by virtue of the result of the integration being set to a defined maximum value before the program temporarily branches back into the main program. In this way, the modelling is calibrated in situations in which the signal of the third lambda probe 35 is reliable and accurate. In other situations, in which, by contrast, the signal of the lambda probes is impaired for example owing to the above-stated cross-sensitivities, a reliable value for the oxygen concentration is obtained by means of the modelling. If the third lambda probe 35 does not indicate a defined filling state (completely full or completely empty) in step 406, then the program returns, without initialization, to the main program.

For closed-loop filling level control, in the main program, it is for example the case that the filling level closed-loop control setpoint value FSRA is varied. For an increase of the filling level in the four-way catalytic converter, the setpoint value is initially increased such that the three-way catalytic converter, as it were, temporarily overflows (with oxygen). If the filling level of the four-way catalytic converter has then reached its setpoint value, the filling level closed-loop control setpoint value FSRA is reduced until the desired filling has been assumed in the three-way catalytic converter. Subsequently, the filling level closed-loop control setpoint value is set to a neutral value, in the case of which the filling level ideally changes no further.

The closed-loop control of the filling level of the four-way catalytic converter 26 is thus performed in model-based fashion, preferably analogously to the closed-loop control of the filling level of the three-way catalytic converter 30, but with the difference that the inlet concentrations of the four-way catalytic converter are not obtained from the signal of a lambda probe in front of the four-way catalytic converter and by means of an inlet emissions model, but rather directly correspond to the modelled outlet emissions of the three-way catalytic converter 30. The negative influence of cross-sensitivities (for example with respect to hydrogen) and dependencies on operating conditions (for example probe temperature) of the lambda probe 34 arranged between the two catalytic converters on the accuracy of the closed-loop filling level control of the four-way catalytic converter, and the correction of said influences on the probe signal, are thereby avoided. In order to be able to realistically represent filling and emptying processes, the catalytic converters 30, 26 are divided into multiple (axial) zones, and the concentrations of the individual exhaust-gas constituents are determined for each of said zones by means of the reaction kinetics.

FIG. 5 shows a flow diagram as an exemplary embodiment of a mode of operation of the internal combustion engine 10 and of the device 50 for supplying secondary air which leads to heating of the four-way catalytic converter 26. For this purpose, a branch is followed out of the main program 400 to a step 410, in which the internal combustion engine 10 is operated such that the outlet emissions model 110 for the concentration of oxygen prevailing at the outlet of the three-way catalytic converter 30 calculates a value which corresponds to an air ratio lambda<0.92. In step 412, the device 50 for supplying secondary air is activated such that the inlet emissions model 210 for the concentration of oxygen prevailing at the inlet of the four-way catalytic converter calculates a value which corresponds to an air ratio lambda equal to 1.

FIG. 6 shows a flow diagram as an exemplary embodiment of a mode of operation of the internal combustion engine 10 and of the device 50 for the supply of secondary air which leads to a regeneration of the four-way catalytic converter. For this purpose, a branch is followed out of the main program 400 to a step 414, in which the internal combustion engine 10 is operated such that the outlet emissions model 110 for the concentration of oxygen prevailing at the outlet of the three-way catalytic converter 30 calculates a value which corresponds to an air ratio lambda 0.98<lambda less than or equal to 1. In step 416, the device 50 for supplying secondary air is activated such that the inlet emissions model 210 for the concentration of oxygen prevailing at the inlet of the four-way catalytic converter 26 calculates a value which corresponds to an air ratio lambda greater than 1.08. With this oxygen excess, soot that has accumulated in the four-way catalytic converter 26 is burned off in the presence of high temperatures. The high temperatures are achieved for example by means of prior heating by means of operation as has been discussed with reference to FIG. 5.

The subjects of FIGS. 4 to 6 illustrate exemplary embodiments of methods in the case of which the internal combustion engine is operated in a manner dependent on an inlet concentration which is determined by means of an inlet emissions model of the second exhaust-gas purification component 27 in a manner dependent on outlet concentrations, calculated by means of an outlet emissions model of the first exhaust-gas purification component 31, of the at least one exhaust-gas constituent and on an introduced secondary air quantity.

The closed-loop control or open-loop control of the lambda value upstream of the four-way catalytic converter 26 for the heating and regeneration thereof is thus performed using the modelled outlet concentrations of the three-way catalytic converter 30. In this case, the introduced secondary air is additionally taken into consideration. For this purpose, an inlet emissions model is provided which converts the outlet concentrations of the three-way catalytic converter 30 and the introduced secondary air into inlet emissions for the four-way catalytic converter 26. The modelled outlet concentrations of the three-way catalytic converter 30 can furthermore be utilized for improved modelling of a soot loading of the four-way catalytic converter 26. A more targeted regeneration of the four-way catalytic converter 26 is thus possible. The negative influence of cross-sensitivities (for example with respect to hydrogen), the pre-catalysis of hydrogen and oxygen on the probe and dependencies on operating conditions (for example probe temperature) of the probe in front of the four-way catalytic converter 26 on the operation of the four-way catalytic converter 26, and the correction of said influences, are thus avoided.

The invention claimed is:

1. A method for operating an internal combustion engine (10) which has an exhaust-gas system (14) comprising a first catalytic converter (31), a second catalytic converter (27) having an accumulator for at least one exhaust-gas constituent arranged downstream of the first catalytic converter (31), and a lambda probe (34) arranged between the first catalytic converter (31) and the second catalytic converter (27), the method comprising:
    calculating, independent of the lambda probe (34), an outlet concentration of the at least one exhaust-gas constituent prevailing at an outlet of the first catalytic converter (31) using an outlet emissions model (110),
    determining an inlet concentration of the at least one exhaust-gas constituent prevailing at an inlet of the second catalytic converter (27) dependent on the calculated outlet concentration from the outlet emissions model (110), and
    operating the internal combustion engine (10) dependent on the thus determined inlet concentration of the at least one exhaust-gas constituent.

2. The method according to claim 1, wherein the internal combustion engine (10) is, for closed-loop control of a filling level of the accumulator of the second catalytic converter (27), operated dependent on the inlet concentration of the second catalytic converter, which is determined as being identical to the calculated outlet concentration of the first catalytic converter (31).

3. The method according to claim 1, characterized in that the concentration calculated by the outlet emissions model (110) for the concentration of the at least one exhaust-gas constituent prevailing at the outlet of the first catalytic converter (31) is used for modelling a soot loading of the second catalytic converter (27).

4. The method according to claim 1, wherein the internal combustion engine (10), having an opening-in point (52) in the exhaust gas system via which secondary air can be injected into the exhaust-gas system (14) is arranged between the first catalytic converter (31) and the second catalytic converter (27), is operated dependent on the inlet concentration which is determined based on an inlet emissions model (210) of the second catalytic converter (27) dependent on the outlet concentration, calculated by the outlet emissions model (110) of the first catalytic converter (31), of the at least one exhaust-gas constituent and on an introduced secondary air quantity.

5. The method according to claim 4, wherein the internal combustion engine (10) is operated such that the outlet emissions model (110) calculates, for the concentration of the at least one exhaust-gas constituent prevailing at the outlet of the first catalytic converter (31), a value which corresponds to an air ratio lambda<1, and in that such an amount of secondary air is injected that the inlet emissions model (210) calculates, for the concentration of the at least one exhaust-gas constituent prevailing at the inlet of the second catalytic converter (27), a value which corresponds to an air ratio lambda equal to 1.

6. The method according to claim 4, characterized in that the internal combustion engine (10) is operated such that the outlet emissions model (110) calculates, for the concentration of the at least one exhaust-gas constituent prevailing at the outlet of the first catalytic converter (31), a value which corresponds to an air ratio lambda for which the following applies: 0.98<lambda≤1, and in that such an amount of secondary air is injected that the inlet emissions model (210) calculates, for the concentration of the at least one exhaust-gas constituent prevailing at the inlet of the second catalytic converter, a value which corresponds to a lambda value greater than 1.

7. A non-transitory computer-readable medium (16.1) on which a computer program product (16.2), which has instructions which cause the control unit (16) to carry out the steps of the method according to claim 1, is stored in machine-readable form.

8. A control unit (16) for an internal combustion engine (10) comprising:
  an exhaust-gas system (14) having
    a first catalytic converter (31),
    a second catalytic converter (27) downstream of the first catalytic converter (31), the second catalytic converter (27) having an accumulator for at least one exhaust-gas constituent, and
    a lambda probe between the first catalytic converter (31) and the second catalytic converter (27),
  wherein the control unit (16) is configured to calculate, independent of the lambda probe (34), an outlet concentration of the at least one exhaust-gas constituent prevailing at an outlet of the first catalytic converter (31) using an outlet emissions model (110), and to determine an inlet concentration of the at least one exhaust-gas constituent prevailing at an inlet of the second catalytic converter (27) dependent on the calculated outlet concentration from the outlet emissions model (110), and to operate the internal combustion engine (10) dependent on the inlet concentration of the at least one exhaust-gas constituent.

9. The control unit (16) according to claim 8, wherein the internal combustion engine (10) is, for closed-loop control of a filling level of the accumulator of the second catalytic converter (27), operated dependent on the inlet concentration of the second catalytic converter, which is determined as being identical to the calculated outlet concentration of the first catalytic converter (31).

10. The control unit (16) according to claim 8, characterized in that the concentration calculated by the outlet emissions model (110) for the concentration of the at least one exhaust-gas constituent prevailing at the outlet of the first catalytic converter (31) is used for modelling a soot loading of the second catalytic converter (27).

11. The control unit (16) according to claim 8, wherein the internal combustion engine (10), having an opening-in point (52) in the exhaust gas system via which secondary air can be injected into the exhaust-gas system (14) is arranged between the first catalytic converter (31) and the second catalytic converter (27), is operated dependent on the inlet concentration which is determined based on an inlet emissions model (210) of the second catalytic converter (27) dependent on the outlet concentration, calculated by the outlet emissions model (110) of the first catalytic converter (31), of the at least one exhaust-gas constituent and on an introduced secondary air quantity.

12. The control unit (16) according to claim 11, wherein the internal combustion engine (10) is operated such that the outlet emissions model (110) calculates, for the concentration of the at least one exhaust-gas constituent prevailing at the outlet of the first catalytic converter (31), a value which corresponds to an air ratio lambda<1, and in that such an amount of secondary air is injected that the inlet emissions model (210) calculates, for the concentration of the at least one exhaust-gas constituent prevailing at the inlet of the second catalytic converter (27), a value which corresponds to an air ratio lambda equal to 1.

13. The control unit (16) according to claim 11, characterized in that the internal combustion engine (10) is operated such that the outlet emissions model (110) calculates, for the concentration of the at least one exhaust-gas constituent prevailing at the outlet of the first catalytic converter (31), a value which corresponds to an air ratio lambda for which the following applies: 0.98<lambda≤1, and in that such an amount of secondary air is injected that the inlet emissions model (210) calculates, for the concentration of the at least one exhaust-gas constituent prevailing at the inlet of the second catalytic converter, a value which corresponds to a lambda value greater than 1.

* * * * *